May 21, 1940.   W. D. LA MONT   2,201,627
COMBUSTION PROCESS AS APPLIED TO VAPOR GENERATION
Original Filed Oct. 5, 1933   2 Sheets-Sheet 1

INVENTOR.
Walter Douglas LaMont
BY
ATTORNEY.

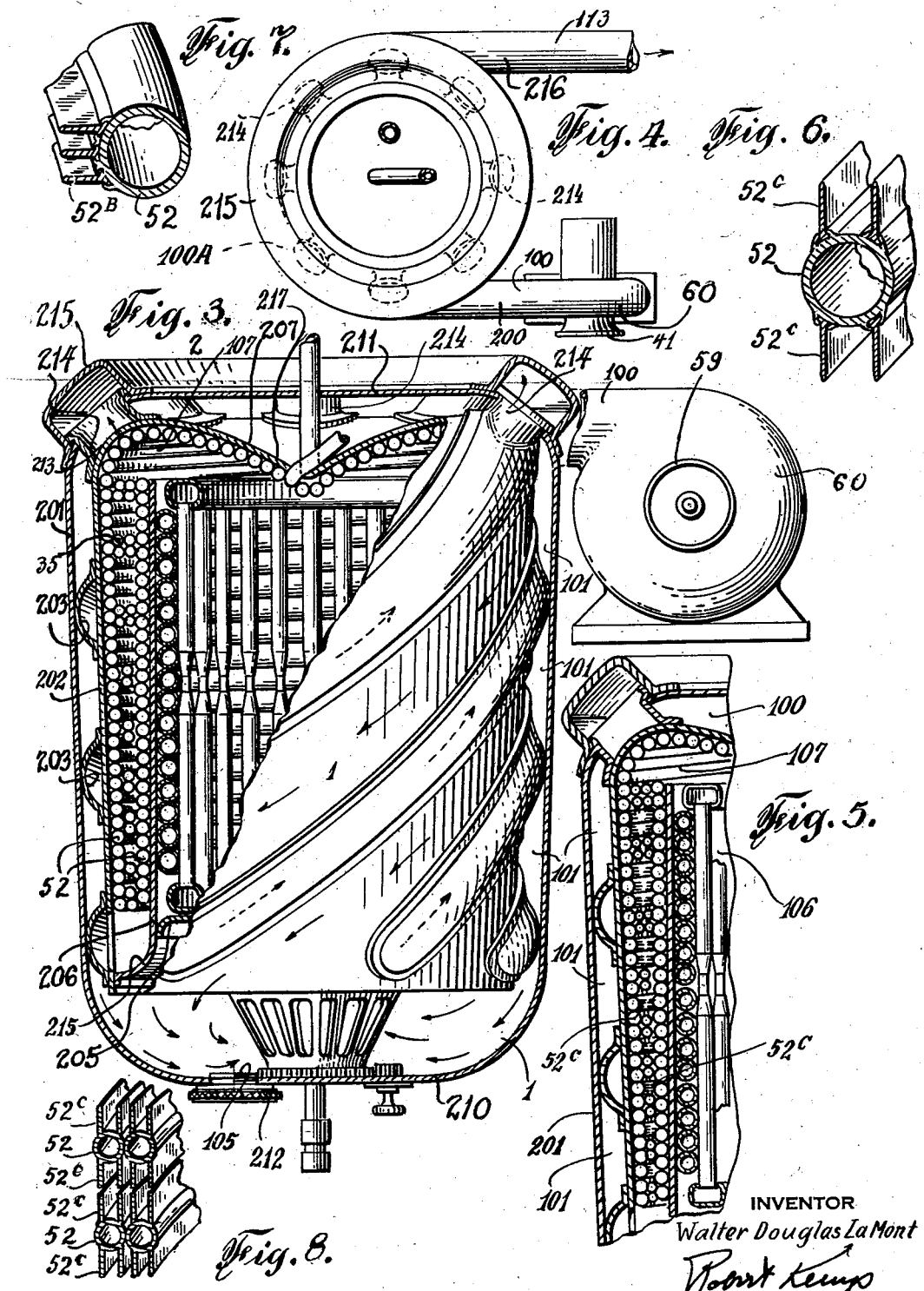

Patented May 21, 1940

2,201,627

UNITED STATES PATENT OFFICE 2,201,627

COMBUSTION PROCESS AS APPLIED TO VAPOR GENERATION

Walter Douglas La Mont, North Colebrook, Conn., assignor to W. D. La Mont Inc., Wilmington, Del., a corporation of Delaware Original application October 5, 1933, Serial No. 692,236. Divided and this application August 26, 1935, Serial No. 37,974

9 Claims. (Cl. 122—250)

This invention relates to a rapid combustion process as applied to high speed steam and power producing apparatus and high speed methods of operating the same.

This application is a division of my application Ser. No. 692,236, filed October 5, 1933.

It is the object of the invention to develop an efficient steam generating process wherein preheated air is directed spirally into a combustion chamber while mixing fuel therewith to effect a heat exchange between the combustion gases generated thereby and circulating water in spirally arranged tubes in the combustion chamber. The passages for the preheated air and the combustion gases are so proportioned that a uniform velocity for the several gases is obtained; the air is guided through passages of increasing volume as the same absorbs heat while the combustion gases are guided through passages of decreasing volume while the same lose heat.

It is a further object of the invention to generate steam rapidly and efficiently by coordinating the travel of the combustion gases with that of the air employed for intermixture with the fuel producing the combustion gases. Not only is the air preheated by the combustion gases prior to the exit of the latter from the boiler, but the former is given a whirling action prior to its mixture with the fuel which is continuous with the whirling action carried on by the combustion gases.

This present invention is particularly concerned with the improvement of high speed steam boilers, and power plants embodying the same, and methods of operating said boilers and said power plants. Where my invention, and/or any of its features, applies to flash boilers and to high speed power plants using said flash boilers, such improvements are well within the scope of my invention as herein described.

While my invention, which has been described herein as relating to steam generating appartus, is intended especially for the generation of steam from water, it will be understood that the terms "steam" and "water" as used in the specifications and claims are intended to include as equivalents, any liquids which might be handled by the novel process and/or apparatus herein described, resulting in the generation of any vapors which might be handled by, or be useful in connection with my process and/or apparatus, and it will also be understood that many of the novel features of this invention are applicable in other fields than that for which the apparatus herein specifically illustrated and described is particularly intended.

Other objects and features will be particularly pointed out and disclosed hereinafter in the illustrations, descriptions, specifications and claims of this present patent application.

In the drawings:

Fig. 3 is an enlarged detailed assembly drawing partially cut away, partially in elevation and section of parts of my high speed steam boiler;

Fig. 4 is a view looking downward on the top of the boiler (reduced in size) showing the turbine driven air supercharger delivering air tangentially to my boiler and a pipe releasing burnt gases tangentially;

Fig. 5 is a detail of Fig. 1, showing the path of travel of burnt gases as applied in connection with my new methods of heat extraction and heat transfer to the working fluid of the boiler;

Fig. 6 is an enlarged view of certain of the working fluid tubes or steam generating elements shown in other figures of the drawings;

Fig. 7 is an enlarged sectional view of my heat interchanging tube with longitudinal fins attached;

Fig. 8 is a sectional view of several heat interchanging tubes as they are arranged in the assembly sectional view shown in Figs. 3 and 5.

Figure 1:
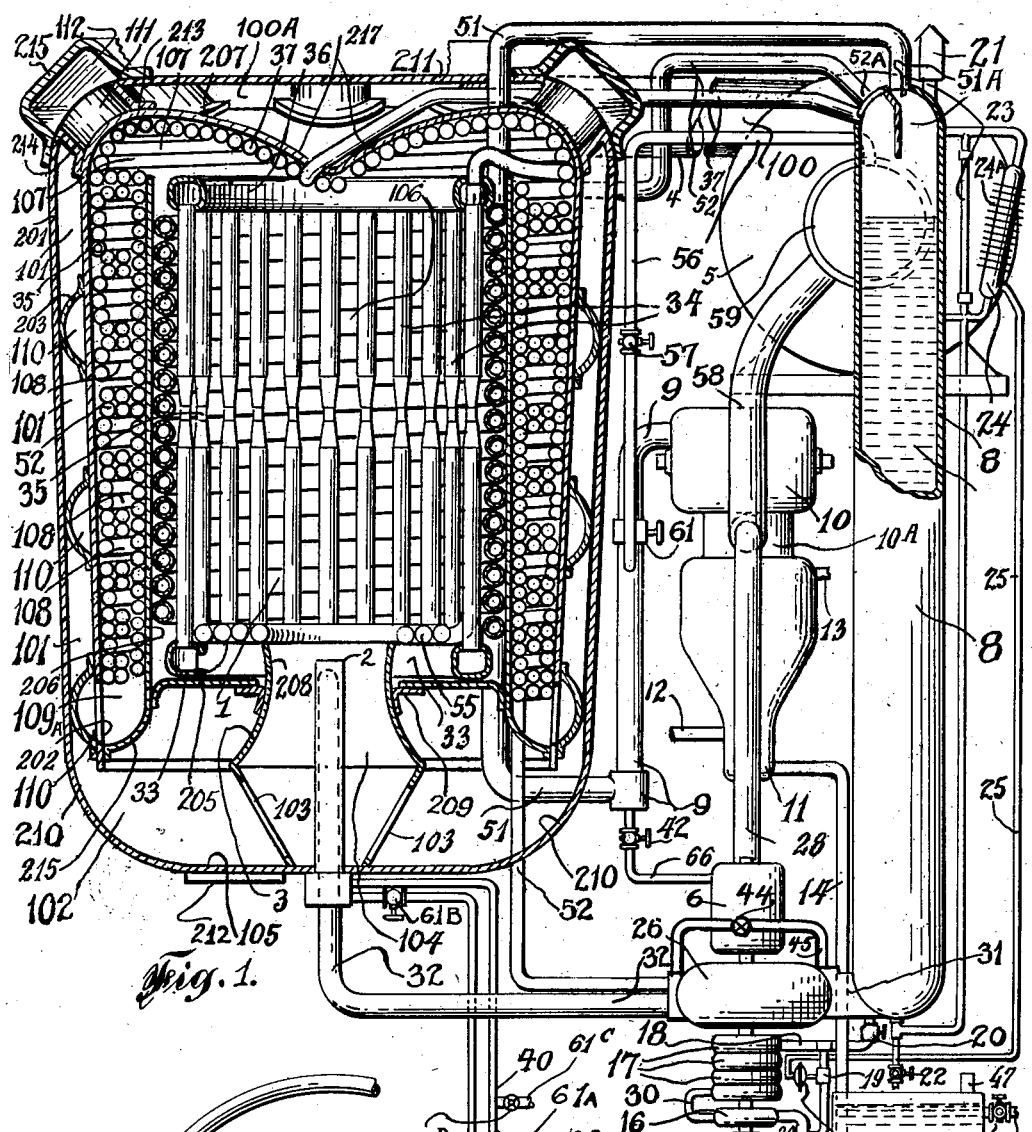
Fig. 1 is a complete power plant showing the direction, the various fluids flow in their respective paths through my boiler and the close interrelation between the action of the boiler and my high speed power plant as a whole of which my boiler forms a part.
Figure 2:
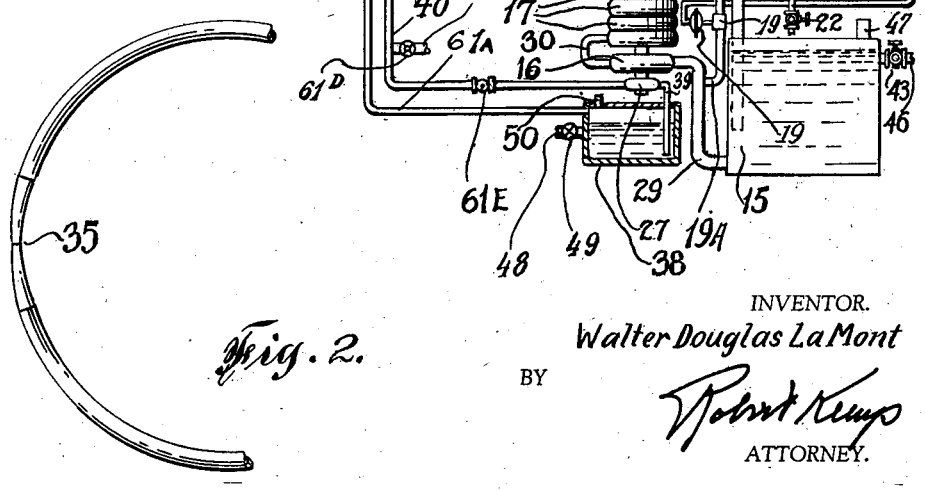
Fig. 2 is a plan view of one of my fluid heater heat absorbing elements, with its pressure drop device as shown in position in Fig. 1 at point 35.

In Figure 1 of the drawings is shown the power plant including as a part thereof, a steam generator adapted to produce steam of high energy content, in accordance with the present invention. The steam generator is designated by 1, having a plurality of steam generator water wall tubes 34 therein receiving water from the water wall inlet header 33, and discharging water and/or steam to the steam generator outlet water wall collecting header 36. The tubes 34 may be arranged helically within the combustion chamber rather than straight. These tubes are exposed to a source of radiant heat produced by a flame fed with fuel from burner 2 in the burner throat 3. The combustion of the fuel oil is assisted by a source of air which may be supplied from the super-charger 5, to which air is admitted through inlet 41, feeding air through the discharge lead 4 to the burner throat. The steam generator tubes are shown fitted with pressure drop devices 35, for controlling the input of water into each tube in sufficient quantity to protect the tube and to control the flow of steam and water in each tube to insure the proper operation thereof, said pressure drop devices being placed in an intermediate portion of the length of each tube, in accordance with a preferred form of the invention. Such a device is shown in detail in Fig. 2.

The steam and water collected in header 36 discharges by way of conduits 37 (Figure 1) into water level cylinder 8 for maintaining a water level in the system, furnishing reserve power, and insuring water supply to the circulating pumps. The steam is separated from the water in the cylinder 8, and passes through the main high pressure steam line 9, having main control valve 61 therein for controlling the steam to the main turbine 10. Furthermore, a pipe line 66 extends from the steam line 9 to auxiliary steam turbine 6 having control valve 42 therein for controlling the drive of auxiliary turbine 6, which drives the fuel oil pump 27, boiler feed pump 17 and boiler circulating pump 26. A separate auxiliary turbine 59 supplied with steam from pipe 56 with control valve 57 therein, drives the air supercharger fan 5.

The main exhaust lead 10^A from the main turbine extends from the latter to the main condenser 11. Pipe 12 represents the inlet for circulating cooling water to the main condenser 11, and pipe 13 is the outlet pipe therefor. Pipe 14 is the condensate water discharge from the main condenser 11 to the main feed tank 15 having feed water inlet 46 and control valve 43 therefor. Vent 47 is associated with the feed water tank, and suction lead 29 extends from the latter to the condensate pump 16 or feed pump 17. 18 is a discharge pipe connecting feed pump 17 with the water level cylinder 8; 19^A is a by-pass line for by-passing feed water around the feed pump 17 through water level regulator valve 19, for controlling the water level in the system; and 20 is a feed stop and check valve on the feed pump discharge lead 18 for stopping and checking the feed of water into the system.

Associated with the cylinder 8 is a safety valve 21 for the boiler at the top of the cylinder, and a blow-off valve 22 at the bottom thereof. The cylinder has a gauge glass 23, and an automatic water level regulator 24^A from which extends a pipe 25 to the control valve 19.

The main steam generator circulating pump is represented at 26. The suction line for pump 26 is connected with the water level cylinder 8, through pipe 31, and the discharge pipe 32 of this pump extends therefrom to the inlet header 33. The main circulating pump is fitted with a by-pass 45 therearound, to control the quantity of water which is circulated by means of control valve 44 in this by-pass.

The fuel oil tank is represented at 38 with its suction line 39, vent 50, filling line 48, and control valve therefor, 49, and burner by-pass return oil discharge lead 61^A. Opening into the fuel line into the burner is a pipe having a control valve therein 61^D for introducing starting oil into the burner, and 61^E is a valve for shutting off the oil normally used in the operation of the plant, while using the starting fuel oil. Pipe 28, constituting the exhaust lead from the auxiliary turbine 6, opens into the main turbine exhaust lead 10^A.

The novel circulating arrangement for the combusion gases and the preheated air is shown generally in Figure 1 and in greater detail in Figures 3 and 5.

The central combustion chamber 106, as shown, has steam generator tubes 34 therein through which water is circulated from inlet header 33 to outlet header 36. The steam and water produced in accordance with the present invention, is discharged into the tube 37 at the end of the boiler opposite the burner, and thence to the water level cylinder 8. Tube 51 extends from the upper end of the cylinder 8 at 51^A, to deliver saturated steam therefrom to the superheater tubes coiled around the interior of the combustion chamber which are shielded by the steam generator tubes 34.

In addition to the steam generating tubes 34 in the combustion chamber, auxiliary steam generating tubes 52 are coiled in annular passage 108, formed on the outside of the combustion chamber 106, and confined by an external wall 202, which forms a tapered passage extending from the inlet thereof at 107, to the outlet thereof, at 109. The combustion gases travel upwardly to the top end of the chamber 106 and then pass through passage 107 downwardly, through the passage 108, giving up the heat contained therein to the steam-generating tubes 52. The tubes 52 may be supplied with circulating water from the main steam generator circulating pump 26 and these tubes discharge the steam and water therein into the water level cylinder at 52^A. These tubes 52 in the convection passage may be provided with fins 52^B and 52^C, extending in parallel to the axis of the tubes, as shown in Figures 6, 7 and 8, for the purpose of more effectively extracting the heat from the combustion gases.

In addition to the steam generating tubes 34 and 52 described above, tubes 55 may be provided for protecting the combustion chamber inlet wall 206, which receive water from the inlet header 33 and discharge water and/or steam to the collecting header 36.

The combustion gases passing downwardly through the convection passage 108, pass through the exits 109^A into a series of spirally disposed burnt gas passages 110. These spiral passages terminate near the top of the boiler into a passage 111, which open into a common outlet passage 112, to which is connected the tangential stack outlet passage 113 opening into the atmosphere, (Fig. 4).

The incoming air used for combustion which is commingled with the fuel supplied by burner 2 in the throat 104, is admitted to the throat through openings 103, after passing in heat-exchanging relationship with the burnt gas passages 110. The air is supplied from the air supercharger 60 (Figure 4), to the pipe 100 opening tangentially into the casing of the boiler 201. This casing forms in conjunction with the walls 203 forming the passage 110, a plurality of spiral air-preheater passages 101, which travel downwardly in Figures 1 and 3 towards the air inlet 103. The area of the spiral air-preheater passages increase from the air inlets to the air outlets, while the burnt gas passages 110 decrease from the inlets to the outlets thereof, for the reasons set forth below.

The improved design of my boiler embodiments described above are predicated upon the theories and features set forth below.

I have found that, with my high speed steam generators with supercharged combustion, a large amount of power can be produced from a small combustion chamber. High initial temperatures are produced in said combustion chamber sending gases of high initial temperature to the convection surfaces. To reduce the temperature of the convection gases, it is general practice to complete the superheating of the steam, the generation of the steam by the convection gases and the preheating of the air by the convection gases.

In order to keep my units in a compact form all convection surfaces must be grouped around my comparatively small combustion chamber. If cross flow is used or parallel flow on straight tubes, the length of gas travel available is very short without using many abrupt 180° turns of the gas, with the gas traveling repeatedly back and forth on said surfaces. It is very desirable to obtain longer gas travel or a type of gas travel over the surfaces which produces a more disruptive effect or upsetting of the gas than is obtained by present methods with cross flow or parallel flow.

In this invention I show the use of spiral flow made by forming spiral passages around my combustion chamber with tubing or metal or both, said passages being tapered to obtain the proper gas velocities as the gas changes in volume and density in its flow throughout the spiral passages.

This arrangement gives a long travel for the gas mainly in parallel spiral flow and permits the using of very high gas velocities considerably above the beginning of the critical condition of flow, with low draft loss.

Where the heat effects are very high the passage may be lined with tubing adjacent to each other eliminating the need of a close contact of the tubing with the metal walls and a carefully designed spacing apart of the tubing on these walls to meet the given heat load.

Where the heat effects are low and the spacing of the tubing is merely a question of obtaining the maximum transfer results to the entire tube surface, metal spiral passages may be used and the tubes spaced only in reference to the heat transfer to the tube surface.

It is a general characteristic of my circumferential heat exchanging for such passages, to taper from a ring shaped inlet opening of wider width to a ring shaped outlet opening of a narrower width, and where tubes or other heat exchange elements occupy such passages in spiral arrangement, the distance between such tubes, (as they spiral in the wider circumferential portion of the passage to the narrower circumferential portion of the passage), is, in accordance with my invention, closer; the tubes are progressively more closely packed, or lay nearer to each other.

The purpose of the more closely packed arrangement of the tubes is to obtain passages of diminishing volume as the heat is withdrawn from the burnt gases, which release their heat to the cooler walls of the tubes containing rapidly flowing boiler working fluids. The velocity of the flow of the heating gases is not slowed down, due to the diminishing density of the hot gas on account of the removal of its heat, which corresponds to the diminution of the volume of the circumferential spiral space through which the gases flow, as those gases flow from a hotter zone to a cooler zone.

In my structural design, my air preheater passages, both for air flow 101 and burnt gas flow 110, are spiral, curved around the boiler and tapered, the taper of each passage for the burnt gas, decreasing in area with the decrease in volume and change in density, and the passages for the air increasing in area with the increase in air volume and change in density, so that the proper velocity of air and burnt gas is maintained throughout the length of these passages as the gases change in volume and density, and travel in counterflow to each other.

Air coming from the tangential air discharge lead 100 of the supercharger fan 5 into the circular air inlet passage 100A to the air preheater, is given a whirling motion.

As the air passes from the circular air inlet passage 100A into the air preheater spiral tapered air passages 101, it is given a further whirling motion in the same direction by having the spiral tapered air passages 101 spiralled in the proper direction to accomplish this purpose.

The air leaving the spiral tapered air preheater air passages passes into the burner circular entrance air passage 102 still whirling, and at the burner entrance 103, it is given a further augmentation of its whirl in the same direction by the burner guide vanes arranged with their curved openings to accomplish this purpose.

From the burner entrance 103, the heated air still whirling enters the burner throat 104, and then into the combustion chamber 106 where it mixes with the fuel, burns, and forms the burnt gases.

The spiral of the waterwall tubing 34 and the superheater tubing 51 in the combustion chamber 106 is so arranged that the air and burnt gases continue to whirl in the same direction as the gases travel in the combustion chamber 106 toward the outlet end into the combustion chamber circular gas inlet passage 107 and then into the spiral tapered convection steam generating burnt gas passage 108.

The spiral of the convection steam generator tubing 52 is wound opposite to that of the waterwall 34 and superheater tubing 51, so that the burnt gases travelling in said passage 108 from the combustion chamber 106 continues to whirl in the same direction.

From the spiral tapered air preheater burnt gas passage 110 the burnt gases travel through the exit connectors 111 of the spiral tapered air preheater burnt gas passages 110 to the circular exit convection burnt gas passage 112 and then through the tangential stack outlet passage 113 to atmosphere.

I have found with my supercharged light weight steam generator that it is necessary to get as high a rate of heat transfer as possible from the convection heating surface, in order to use a minimum amount of surface in this part of the apparatus for reducing the gas temperature and thereby keep the weight of this surface to a minimum.

With supercharged combustion as previously brought out, in the description of this invention, high initial temperatures of the convection gases can be obtained.

The recent advance in design of supercharging air fans of high speed and efficiency, small size and light weight delivering air at high pressure with low power loss makes possible very close spacing of the convection heating surface with use of very high gas velocities and complete disruption or upsetting of the gas in its travel over the convection heating surface. The critical condition of gas flow, can be reached and utilized to a degree heretofore impossible with the limited draft loss formerly available for use with steam generators.

By using tapered gas passages in the steam generating apparatus, including the passages for air as well as for fuel gas, the high velocities initially used in said passages, may be maintained and even gradually increased or decreased, as desired, to obtain desired velocities with the changing volume and density of the gas as it is cooled or heated.

I streamline many of my fluid passageways throughout the boiler structure, especially at the turns and at changes in direction of the flow of gases. High velocity of gas flow can be maintained throughout the system with small draft loss at these points leaving the main draft loss available for high speed travel over the heating surfaces where such loss is more than repaid by the increased heat transfer rates obtained.

Although it is not shown exactly this way on the drawing the burnt gases as they leave the combustion chamber flow through heat exchanging passageways constantly diminishing in their volume, in other words to correspond with the difference and reduction in the volume of the gases as they flow out from the combustion chamber.

It is better that when the burnt gases are making their various turns and until they have all of their heat extracted from them not to be expanded at any point in their whirling outward travel from the combustion chamber. When such gases expand in volume due to entering a larger space they tend to absorb the heat rather than release it and this is not to be desired. It is much to be preferred that the gases as they travel outwardly continuously reduce in volume as they are losing their heat so that their velocity may be maintained and heat transferring operations conducted under favorable conditions.

I claim:

1. A process for producing combustion which comprises heating air while passing it around a combustion zone in a whirling manner, directing said heated air spirally into the combustion zone while mixing fuel therewith, deoxidizing said air in the combustion zone while it is whirling and maintaining the velocity of said air being heated substantially constant, by guiding it through a passage of expanding volume.

2. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization, and maintaining the velocity of the combustion gases substantially constant by guiding them through a passage of diminishing volume while they are losing their heat.

3. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization, and maintaining the velocity of the air and combustion gases substantially constant by guiding the air through a passage of increasing volume and the combustion gases through a passage of diminishing volume.

4. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization and traveling spirally in a direction countercurrent to the combustion gases, and maintaining the velocity of the combustion gases substantially constant by guiding them through a passage of diminishing volume while they are losing their heat.

5. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid travelling spirally and undergoing vaporization, and maintaining the velocity of the air and combustion gases substantially constant by guiding the air through a passage of increasing volume and the combustion gases through a passage of diminishing volume.

6. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization and subsequently in heat exchanging relation to the air undergoing preheating, and maintaining the velocity of the air being preheated substantially constant by guiding it through a passage of expanding volume.

7. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization, and subsequently in heat exchanging relation to the air undergoing preheating, and maintaining the velocity of the air and combustion gases substantially constant by guiding the air being preheated through a passage of increasing volume and the combustion gases through a passage of diminishing volume.

8. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization and subsequently in heat exchanging relation to the air undergoing preheating, and maintaining the velocity of the combustion gases substantially constant by guiding said gases through a passage of diminishing volume.

9. A steam generating process which comprises heating air while passing it around a combustion zone in a whirling manner, directing said heated air spirally into the combustion zone while mixing fuel therewith, deoxidizing said air in the combustion zone while it is whirling and presenting the resulting combustion gases in heat exchanging relation to working fluid undergoing vaporization and preheating and subsequently in heat exchanging relation to the air undergoing preheating, and maintaining the velocity of the air and combustion gases substantially constant by guiding the air being preheated through a passage of increasing volume and the combustion gases through a passage of diminishing volume.

WALTER DOUGLAS LA MONT.